Figure 1:
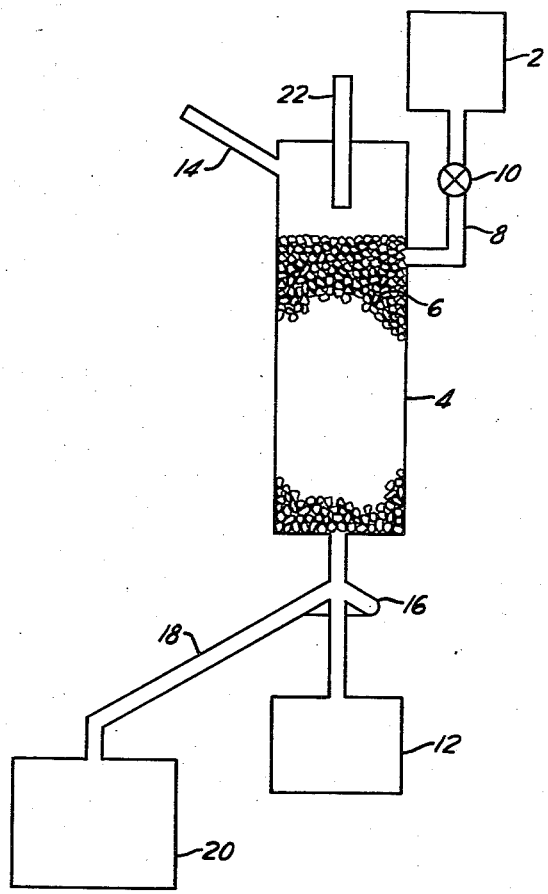

July 3, 1962 R. E. HALTER ETAL 3,042,697
PROCESS FOR MAKING PHOSPHORUS ACID ESTERS
Filed Oct. 28, 1958

INVENTORS
ROBERT E. HALTER
ROBERT J. HARTLE
BY

ATTORNEY

United States Patent Office 3,042,697
Patented July 3, 1962

3,042,697
PROCESS FOR MAKING PHOSPHORUS ACID ESTERS
Robert E. Halter, Verona, and Robert J. Hartle, Gibsonia, Pa., assignors to Gulf Research & Development Company, Pittsburgh, Pa., a corporation of Delaware
Filed Oct. 28, 1958, Ser. No. 770,197
7 Claims. (Cl. 260—461)

This invention relates to a process for the preparation of esters and more particularly to a process for the preparation of esters of phosphorus (that is, esters of acids containing phosphorus).

Briefly stated the process of this invention is directed to the continuous preparation of esters of phosphorus which comprises passing a phosphorus-containing compound and an alcohol through a reaction zone counter-current to each other and under controlled conditions so as to promote the reaction of said reactants and obtain an ester of said phosphorus compound. The esters prepared in accordance with this invention can be employed as plasticizers, preignition suppressors for engines burning gasoline, non-flammable hydraulic fluids, extractants for rare metal salts, etc.

The phosphorus-containing compound which is used in the process of this invention is one selected from the group of phosphorus-containing compounds represented by the following structural formulae:

and

wherein X is a halogen selected from the group consisting of chlorine and bromine, Y and Z, which can be the same or different, can be selected from the group consisting of halogen or an R or OR group wherein R can be a hydrocarbon radical such as alkyl, alkoxyalkyl, cycloalkyl, alkaryl, aryl and aralkyl having from one to 12 carbon atoms in the radical, and A can be oxygen or sulfur. Examples of such phosphorus-containing compounds which can be used are phosphorus oxychloride, phosphorus trichloride, thiophosphoryl chloride, phenyl phosphorus dichloride, phenyl phosphoric dichloride, phenyl phosphonothioic dichloride, phenyl phosphorodichloridate, diphenyl phosphinous chloride, diphenyl phosphorochloridate, diphenyl phosphorochlorodite, diphenyl phosphonic chloride, etc. We have found that phosphorus oxychloride is particularly effective in the process of this invention.

The alcohol which is employed in the process of this invention can be defined as one selected from the group of alcohols represented by the following structural formulae:

and

wherein R can be defined as a hydrocarbon radical which can be alkyl, aryl, cycloalkyl, alkaryl, alkoxyalkyl, haloalkyl, haloaryl, alkenyl, alkynyl, heterocyclic, etc. In the foregoing list any alkyl, aryl, alkaryl or alkaryl radical, such as methyl, ethyl, octyl, dodecyl, butoxyethyl, cyclohexyl, β-naphthyl, benzyl, 6-phenylhexyl, tolyl, p-(butoxyethyl)phenyl, propenyl, etc., can be substituted for phenyl. Examples of alcohols which can be used in the process of this invention are methyl, ethyl, propyl, isopropyl, butyl, amyl, isooctyl, 2-ethylhexyl, 2-methoxyethyl, 2-ethoxyethyl, 2-butoxyethyl, cyclohexyl, tetrahydrofurfuryl, chloroethyl, ethylene glycol, propylene glycol, 1,3-propanediol, phenol, cresol, catechol, etc. Best results are obtained with alkanols and alkoxyalkanols.

As noted, the present reaction involves counter-current movement of the reactants through the reaction zone. The desired reaction can better be described by reference to the flow diagram in FIGURE 1 which illustrates a preferred embodiment thereof.

The phosphorus-containing compound described above is placed in container 2 and introduced into column 4, containing a packing material 6, by line 8 containing valve 10. The packing, which can be of any type which is inert to the reactants and which establishes efficient contact between the reactants, can include such materials as glass helices, Raschig rings, stainless steel turnings, ceramic chips, etc. If a catalyst such as ferric chloride, zinc chloride, aluminum chloride in an amount of about 0.1 to about 1.0 percent by weight based on the total amount of reactants, is used, the packing can be made of or coated with the catalyst. In order to promote the reaction and permit free flow of reactants and product through the reaction zone, the packing must be uniformly distributed throughout the zone, and, in addition, the amount of free space relative to the packing is critical and must be maintained within the ratio of about 2:1 to about 5:1, preferably about 4:1.

The alcohol employed is placed in container 12 and sufficient heat is added to the container by external means to raise the temperature of the alcohol in order to vaporize the same. Generally, depending upon the alcohol being used, a temperature of about 50° to about 150° C. and a pressure of about 5 mm. to 760 mm. Hg is sufficient for such purpose. The vapors of alcohol thus formed move upwardly through column 4 and react with the phosphorus-containing compound to form the corresponding ester thereof. Gaseous by-products, such as hydrogen chloride, are removed from the reaction zone as soon as formed, in order to inhibit side reactions, by vacuum line 14. The product ester is caught in annular trap 16 and passed by line 18 into receiver 20.

Since it is desired to produce triesters in accordance with the process of this invention at least about one equivalent of hydroxyl compound is desirably employed per halogen atom present in the phosphorus-containing compound. However, in order to suppress side reactions, particularly with respect to the phosphorus-containing compound, an excess of alcohol in the reaction zone is desirably used, preferably about 1.2 to about 2.0 equivalents of hydroxyl compound per halogen atom present in the phosphorus-containing compound.

The temperature of the reaction must be maintained below the boiling point of the product but above that of least one of the reactants at the prevailing pressure in order to permit the desired reaction to go satisfactorily. Thus a temperature of about 50° to about 150° C., preferably about 75° to about 100° C. is satisfactory. In order to minimize side reactions and to maintain the reactants in vapor state, particularly in the preparation of trialkylphosphates, and to sweep out of the reaction zone gaseous by-products which are formed, the pressure is maintained low. Preferably a range of about 5 to about 760 mm. Hg can be used. For example, in making tri-(methoxyethyl)phosphate from phosphorus oxychloride and 2-methoxyethanol, we can employ a temperature of about 65° to about 150° C., preferably about 65° to about 100° C., and a pressure of about 50 to about 760 mm. Hg, preferably a pressure of about 100 to about 400 mm. Hg. A contact time of about one to about two minutes is satisfactory. To make tri(butoxyethyl)phosphate, a temperature of about 65° to about 100° C. and a pressure of about 5 to about 50 mm. Hg is satisfactory using phosphorus oxychloride and 2-butoxyethanol as starting material. For this reaction a contact time of about one to about two minutes is suitable.

The total length of time in which the reactants are in contact with each other is extremely important and must be at least about 30 seconds, preferably about one to about three minutes. A slow stream of an inert gas, e.g., nitrogen, helium or natural gas can be used to aid in vaporizing the alcohol and maintaining the proper flow rate and contact time.

The advantages of operating in accordance with the process of this invention are many. The phosphorus-containing compound, for example phosphorus oxychloride, when introduced into column 4 is in the form of a vapor. The alcohol, also in vapor form, for example, 2-methoxy ethanol, originally in container 12, rises upwardly in column 4 and meets the phosphorus-containing compound. The two vapors are joined and react to form the mono phosphoric ester which is a liquid at the pressure and temperature conditions existing in the column. To aid in condensing reactants and the ester a condenser 22 can be employed. At this point the ester begins moving downwardly through the column and meets additional alcohol vapor rising upwardly through the column. The diester thus formed continues in its movement down through the column to meet additional alcohol vapor and form the phosphorus triester which is then collected in receiver 20. The vaporous gaseous by-product, in this case for example, hydrogen chloride, is continuously removed from the system by line 14.

It can be seen from the above that operation in accordance with the process greatly facilitates optimum contact of the reactants most likely to react with each other and that the desired sequence of reactions, from monoester to triester, occurs automatically. Thus the initial contact at the top of column 4 is between the phosphorus-containing charge and alcohol. As soon as this initial reaction occurs to form a liquid monoester, the latter drops down the column. At this point the reactants present are monoester and alcohol and the product formed is the diester. The diester in turn finds itself concentrated in the lower portion of column 4 with alcohol and the triester is thereby formed. The column is so designed, including the packing 4 therein, and the flow of reactants is controlled in order to help obtain the above.

The invention can further be understood by reference to the following representative examples.

*Example I*

A reaction system similar to that illustrated in FIGURE 1 was employed. 250 cc. of 2-methoxyethanol was placed in container 12 and heated to 68° C. in order to vaporize the same. A pressure of about 2.0 pounds per square inch absolute and a temperature of 68° C., were maintained in column 4. The alcohol was then fed into the column at the rate of 100 cc. per hour. Phosphorus oxychloride (77 grams) was placed in container 2 and metered into the column at the rate of 0.420 cc. per minute. Vaporous hydrogen chloride was continuously removed from the reaction zone as soon as formed by vacuum line 14. The reaction was permitted to proceed for a period of 2 hours. 78 grams of tri(methoxyethyl)-phosphate was recovered by distillation, which amounts to a yield of 57 percent based on the phosphorus oxychloride employed.

*Example II*

The run of Example I was repeated with several differences. The temperature was maintained at 93° C. and the phosphorus oxychloride was metered into the column at the rate of 0.475 cc. per minute. 86 grams of tri-(methoxyethyl)phosphate was recovered, amounting to a yield of 63 percent.

*Example III*

The run of Example I was again repeated. In this case, however, phosphorus oxychloride was added at the rate of 1.10 cc. per minute and the reaction temperature was maintained at 93° C. 74 grams of tri(methoxyethyl)phosphate was recovered, amounting to a yield of 54 percent.

From the above it can be seen that excellent single-pass yields of triester are obtained in accordance with the process of the present invention. While in the above examples, only one phosphorus-containing compound and one alcohol were used, comparable results will be obtained with other phosphorus-containing compounds and other alcohols.

Obviously, many modifications and variations of the invention, as hereinabove set forth, can be made without departing from the spirit and scope thereof, and therefore only such limitations should be imposed as are indicated in the appended claims.

We claim:

1. A continuous process for the preparation of esters of phosphorus which comprises passing a phosphorus-containing compound selected from compounds having the following structural formulae:

and

wherein X is a halogen selected from the group consisting of chlorine and bromine; Y and Z are selected from the group consisting of halogen, a hydrocarbon radical and —OR, wherein R is a hydrocarbon radical; and A is selected from the group consisting of oxygen and sulfur downwardly through a column containing packing material, passing vapor of an alcohol upwardly through said column, maintaining temperature and pressure conducive to the reaction between said phosphorus-containing compound and said alcohol in said column, and thereafter obtaining an ester of phosphorus adjacent the base of said column.

2. A continuous process for the preparation of esters of phosphorus which comprises passing a phosphorus-containing compound selected from compounds having the following structural formulae:

and

wherein X is a halogen selected from the group consisting of chlorine and bromine; Y and Z are selected from the group consisting of halogen, a hydrocarbon radical and —OR, wherein R is a hydrocarbon radical; and A is selected from the group consisting of oxygen and sulfur downwardly through a column containing packing material, passing vapor of an alcohol upwardly through said column, maintaining a temperature of about 50° to about 150° C. and a pressure of about 5 to about 760 mm. of mercury in said column, and thereafter obtaining an ester of phosphorus adjacent the base of said column.

3. A continuous process for the preparation of esters of phosphorus which comprises passing a phosphorus-containing compound selected from compounds having the following structural formulae:

and

wherein X is a halogen selected from the group consisting of chlorine and bromine; Y and Z are selected from the group consisting of halogen, a hydrocarbon radical and —OR, wherein R is a hydrocarbon radical; and A is selected from the group consisting of oxygen and sulfur downwardly through a column containing packing material, passing vapor of an alcohol upwardly through said column, maintaining a temperature of about 50° to about 150° C. and a pressure of about 5 to about 760 mm. of mercury in said column and a total contact time between said reactants of about ½ to about 3 minutes, and thereafter obtaining an ester of phosphorus adjacent the base of said column.

4. A continuous process for the preparation of tri-(methoxyethyl)phosphate which comprises passing phosphorus oxychloride downwardly through a column containing a packing material, passing vapor of 2-methoxyethanol upwardly through said column, maintaining temperature and pressure conducive to the reaction between said compounds in said column and thereafter obtaining tri(methoxyethyl)phosphate adjacent the base of said column.

5. A continuous process for the preparation of tri-(methoxyethyl)phosphate which comprises passing phosphorus oxychloride downwardly through a column containing a packing material, passing vapor of 2-methoxyethanol upwardly through said column, maintaining a temperature of about 65° to about 150° C. and a pressure of about 50 to about 760 mm. of mercury in said column, and thereafter obtaining tri(methoxyethyl)phosphate adjacent the base of said column.

6. A continuous process for the preparation of tri-(methoxyethyl)phosphate which comprises passing phosphorus oxychloride downwardly through a column containing a packing material, passing vapor of 2-methoxyethanol upwardly through said column, maintaining a temperature of about 65° to about 100° C. and a pressure of about 100 to about 400 mm. of mercury in said column and a total contact time between said reactants of about one to about three minutes, and thereafter obtaining tri(methoxyethyl)phosphate adjacent the base of said column.

7. A continuous process for the preparation of tri-(butoxyethyl) phosphate which comprises passing phosphorus oxychloride downwardly through a column containing a packing material, passing vapor of 2-butoxyethanol upwardly through said column, maintaining a temperature of about 65° to about 100° C. and a pressure of 5 to 50 mm. of mercury in said column and a total contact time between said reactants of about one to about three minutes and thereafter obtaining tri (butoxyethyl) phosphate adjacent the base of said column.

References Cited in the file of this patent
UNITED STATES PATENTS

| | | |
|---|---|---|
| 1,141,266 | Raschig | June 1, 1915 |
| 1,766,721 | Nicolai | June 24, 1930 |
| 1,944,530 | Schonburg | Jan. 23, 1934 |
| 2,008,478 | Vanderbilt et al. | July 16, 1935 |
| 2,325,979 | Sarbach | Aug. 3, 1943 |
| 2,650,935 | Gamrath | Sept. 1, 1953 |

Notice of Adverse Decision in Interference

In Interference No. 94,085 involving Patent No. 3,042,697, R. E. Halter and R. J. Hartle, PROCESS FOR MAKING PHOSPHORUS ACID ESTERS, final judgment adverse to the patentees was rendered June 30, 1967, as to claims 1, 2 and 3.

[*Official Gazette June 3, 1969.*]